(12) United States Patent
Wu et al.

(10) Patent No.: US 9,577,505 B1
(45) Date of Patent: Feb. 21, 2017

(54) BOOTSTRAP CONTROLLER FOR SWITCHING POWER SUPPLY

(71) Applicant: Dell Products L.P., Round Rock, TX (US)

(72) Inventors: Feng-Yu Wu, Taipei (TW); Tsai-Fu Hung, New Taipei (TW)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 14/810,694

(22) Filed: Jul. 28, 2015

(51) Int. Cl.
| | | |
|---|---|---|
| *G05F 1/00* | (2006.01) |
| *H02M 1/08* | (2006.01) |
| *H02M 3/07* | (2006.01) |
| *H02M 3/158* | (2006.01) |

(52) U.S. Cl.
CPC ............... *H02M 1/08* (2013.01); *H02M 3/07* (2013.01); *H02M 3/1588* (2013.01)

(58) Field of Classification Search
CPC .......................... H02M 3/156; H02M 3/1582
USPC ........................................ 323/259, 282, 344
See application file for complete search history.

(56) References Cited

U.S. PATENT DOCUMENTS

| | | | | |
|---|---|---|---|---|
| 5,705,919 A | * | 1/1998 | Wilcox .................... | G05F 1/618 323/268 |
| 6,201,717 B1 | * | 3/2001 | Grant ...................... | H02M 3/07 363/131 |
| 7,737,666 B2 | * | 6/2010 | Sutardja ............... | H02M 3/1588 323/222 |
| 2007/0159150 A1 | * | 7/2007 | Hosokawa .......... | H02M 3/1588 323/285 |
| 2007/0182390 A1 | * | 8/2007 | Ishii ..................... | H03K 17/163 323/282 |
| 2010/0289560 A1 | * | 11/2010 | Mavencamp ........... | H02M 1/08 327/538 |
| 2012/0242393 A1 | * | 9/2012 | Chen .................... | H03K 17/165 327/390 |
| 2015/0061611 A1 | * | 3/2015 | Li ....................... | H02M 3/1588 323/235 |

FOREIGN PATENT DOCUMENTS

| | | |
|---|---|---|
| EP | 0 045 133 B1 | 2/1985 |
| EP | 0 129 661 A2 | 2/1985 |

OTHER PUBLICATIONS http://www.talkingelectronics.com/projects/MOSFET/MOSFET.html, The MOSFET—How the Mosfet works, pp. 1-10.*

* cited by examiner

*Primary Examiner* — Jeffrey Gblende
*Assistant Examiner* — Alex Torres-Rivera
(74) *Attorney, Agent, or Firm* — Baker Botts L.L.P.

(57) ABSTRACT

Systems and methods for operating a switching converter are disclosed. The switching converter includes a high-side transistor coupled between a voltage input and a switching node and a low-side transistor coupled between the switching node and ground. The switching converter also includes a high-side driver coupled to drive a gate of the high-side transistor, a charge pump coupled to the high-side driver, and a bootstrap circuit, which includes a pass transistor coupled between the charge pump and the switching node, and a pull-down transistor coupled between the charge pump and ground.

18 Claims, 5 Drawing Sheets

302

| | High-Side Transistor 220 | Low-Side Transistor 222 | Bootstrap Circuit Pass Transistor 246 | Bootstrap Circuit Pull-Down Transistor 244 |
|---|---|---|---|---|
| First Phase | ON | OFF | ON | OFF |
| Second Phase | OFF | ON | ON | OFF |
| Third Phase | OFF | OFF | OFF | ON |

| | High-Side Transistor 220 | Low-Side Transistor 222 | Bootstrap Circuit Pass Transistor 246 | Bootstrap Circuit Pull-Down Transistor 244 |
|---|---|---|---|---|
| $V_{208} < 3V$ | OFF | OFF or ON | OFF | ON |
| $3V < V_{208} < 4.5V$ | (same as table 302) | (same as table 302) | (same as table 302) | (same as table 302) |
| $V_{208} > 4.5V$ | ON or OFF | OFF or ON | ON | OFF |

FIG. 3B

BOOTSTRAP CONTROLLER FOR SWITCHING POWER SUPPLY

TECHNICAL FIELD

The present disclosure relates in general to switching power supplies, and more particularly to driving a high-side transistor of a switching power supply.

BACKGROUND

As the value and use of information continues to increase, individuals and businesses seek additional ways to process and store information. One option available to users may be information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information may be handled, how the information may be handled, how much information may be processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications.

Information handling systems may include a variety of hardware and/or software components that may be configured to process, store, and/or communicate information. Information handling systems may also include one or more power supplies to power one or more other devices in the information handling system. Switching power supplies may be utilized, for example, to efficiently convert a higher-voltage supply (e.g., a battery or an external source) to a lower voltage suitable for use by other components (e.g., a processor or a memory) within the information handling system.

SUMMARY

In accordance with the teachings of the present disclosure, disadvantages and problems associated with user exposure to a light source may be substantially reduced or eliminated.

In accordance with one embodiment of the present disclosure, a switching converter includes a power stage having a high-side transistor coupled between a voltage input and a switching node and a low-side transistor coupled between the switching node and ground. The switching converter also includes a high-side driver coupled to drive a gate of the high-side transistor, a charge pump coupled to the high-side driver, and a bootstrap circuit, which includes a pass transistor coupled between the charge pump and the switching node of the power stage, and a pull-down transistor coupled between the charge pump and ground.

In accordance with another embodiment of the present disclosure, a method for operating a switching converter includes driving a high-side transistor of a switching converter, coupled between a voltage input and a switching node of the switching converter, on during a first phase, driving a low-side transistor of the switching converter, coupled between the switching node of the switching converter and ground, on during a second phase, and driving the low-side transistor and the high-side transistor off during a third phase. The method further includes coupling a charge pump node to the switching node of the switching converter during the first phase and the second phase, coupling the charge pump node to a low voltage source during the third phase.

In accordance with yet another embodiment of the present disclosure, a method for operating a switching converter includes driving a high-side transistor of a switching converter, coupled between a voltage input and a switching node of the switching converter, on during a first phase, driving a low-side transistor of the switching converter, coupled between the switching node of the switching converter and ground, on during a second phase, and driving the low-side transistor and the high-side transistor off during a third phase. The method further includes sensing the voltage across a capacitor of a charge pump of the switching converter. When the voltage across the capacitor is lower than a first threshold, a charge pump node may be coupled to a low voltage source during the second and third phase. When the voltage across the capacitor is between the first threshold and a second threshold, the charge pump node may be coupled to the switching node during the first and second phases, and coupling the charge pump node to the low voltage source during the third phase. When the voltage across the capacitor is greater than the second threshold, the charge pump node may be coupled to the switching node during the first, second, and third phases.

Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 3A illustrates a table depicting the operation of components of a buck converter, in accordance with certain embodiments of the present disclosure;

FIG. 3B illustrates a table depicting the operation of components of a buck converter, in accordance with certain embodiments of the present disclosure;

DETAILED DESCRIPTION

Preferred embodiments and their advantages are best understood by reference to FIGS. 1-5, wherein like numbers are used to indicate like and corresponding parts.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage resource, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

Figure 1:
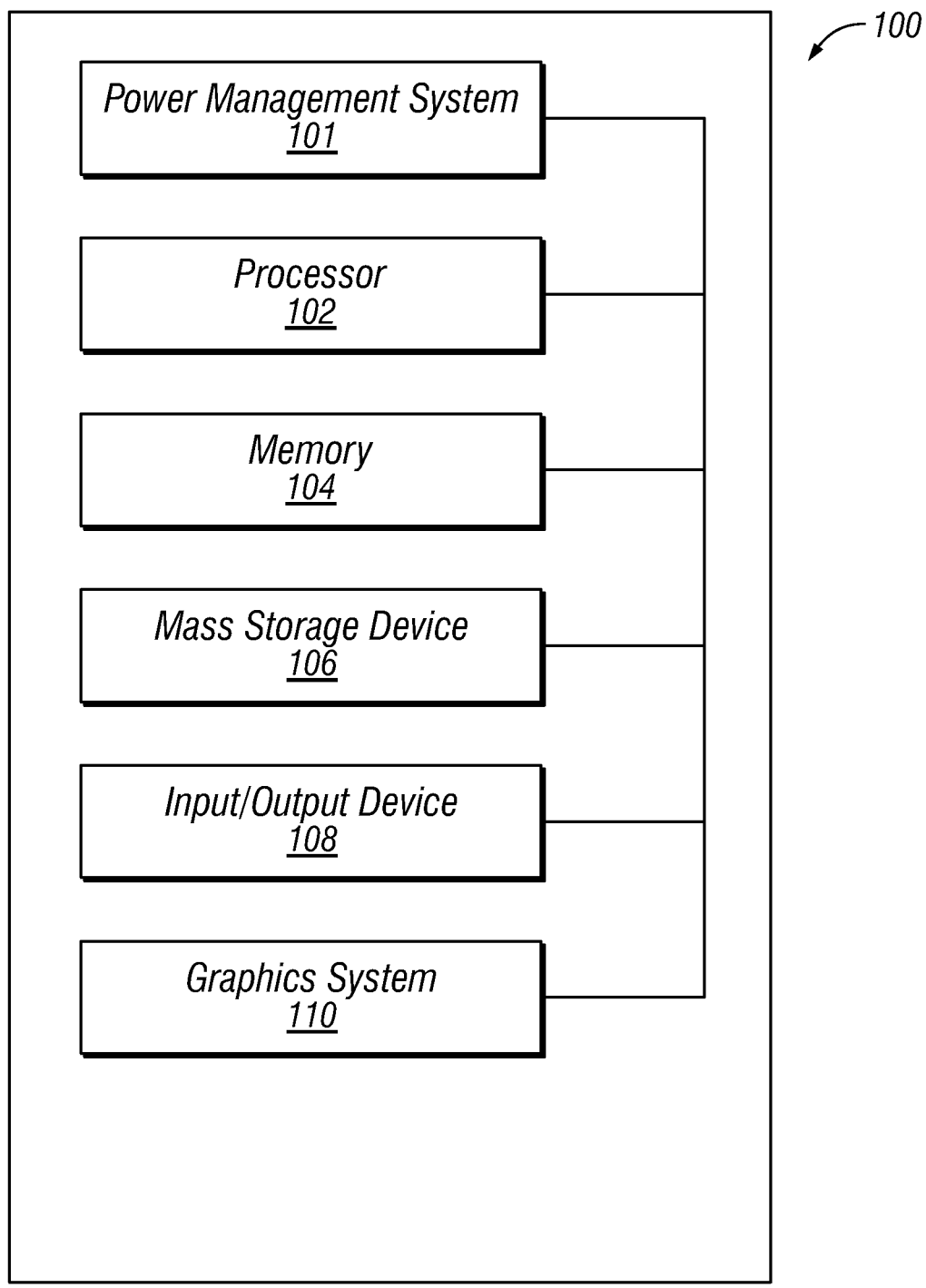
FIG. 1 illustrates a block diagram of an example information handling system, in accordance with certain embodiments of the present disclosure.

FIG. 1 illustrates a block diagram of an example information handling system 100, in accordance with certain embodiments of the present disclosure. Information handling system 100 may generally be operable to receive data from, and/or transmit data to, other information handling systems 100. In one embodiment, information handling system 100 may be a desktop computer, laptop computer, tablet computer, mobile wireless device, wireless communication device, a wearable computing device, and/or any other suitable computing device. In the same or alternative embodiments, information handling system 100 may be a server or a storage array configured to include multiple storage resources (e.g., hard drives) in order to manage large amounts of data. In some embodiments, information handling system 100 may include, among other suitable components, power management system 101, processor 102, memory 104, mass storage device 106, input-output device 108, and graphics system 110.

Power management system 101 may include any suitable device or devices to supply power to one or more other components of information handling system 100. For example, power management system 101 may include one or more AC-to-DC converters configured to convert AC power from an external power source into a DC voltage. Power management system 101 may also include one or more DC-to-DC converters that may be configured to convert for example, a high-power DC voltage source into one or more lower power DC voltage sources that may be utilized by other components of information handling system 100 (e.g., processor 102 and memory 104). Power management system 101 may also include a battery, which may be utilized to power one or more components of information handling system 100 when an external power source is not available.

Processor 102 may include any system, device, or apparatus operable to interpret and/or execute program instructions and/or process data. Processor 102 may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 102 may interpret and/or execute program instructions and/or process data stored in memory 104, mass storage device 106, and/or another component of system 100.

Memory 104 may be communicatively coupled to processor 102 and may include any system, device, or apparatus operable to retain program instructions or data for a period of time (e.g., computer-readable media). Memory 104 may include random access memory (RAM), electrically erasable programmable read-only memory (EEPROM), flash memory, magnetic storage, opto-magnetic storage, or any suitable selection and/or array of volatile or non-volatile memory that retains data after power to system 100 may be removed.

Mass storage device 106 may include one or more storage resources (or aggregations thereof) communicatively coupled to processor 102 and may include any system, device, or apparatus operable to retain program instructions or data for a period of time (e.g., computer-readable media). Mass storage device 106 may retain data after power to system 100 may be removed. Mass storage device 106 may include one or more hard disk drives (HDDs), magnetic tape libraries, optical disk drives, magneto-optical disk drives, compact disk drives, compact disk arrays, disk array controllers, solid state drives (SSDs), and/or any computer-readable medium operable to store data.

Input-output device 108 may be communicatively coupled to processor 102 and may include any instrumentality or aggregation of instrumentalities by which a user may interact with system 100 and its various information handling resources by facilitating input from a user allowing the user to manipulate system 100 and output to a user allowing system 100 to indicate effects of the user's manipulation. For example, input-output device 108 may permit a user to input data and/or instructions into system 100 (e.g., via a keyboard, pointing device, and/or other suitable means), and/or otherwise manipulate system 100 and its associated components. In these and other embodiments, input-output device 108 may include other user interface elements (e.g., a keypad, buttons, and/or switches placed in proximity to a display) allowing a user to provide input to system 100.

Graphics system 110 may be communicatively coupled to processor 102 and may include any system, device, or apparatus operable to receive and process video information. Graphics system 110 may additionally be operable to transmit digital video information to a display. Graphics system 110 may include any internal graphics capabilities including for example, but not limited to, integrated graphics or a graphics card. Graphics system 110 may include graphics drivers, graphics processors, and/or any other suitable components.

Figure 2:
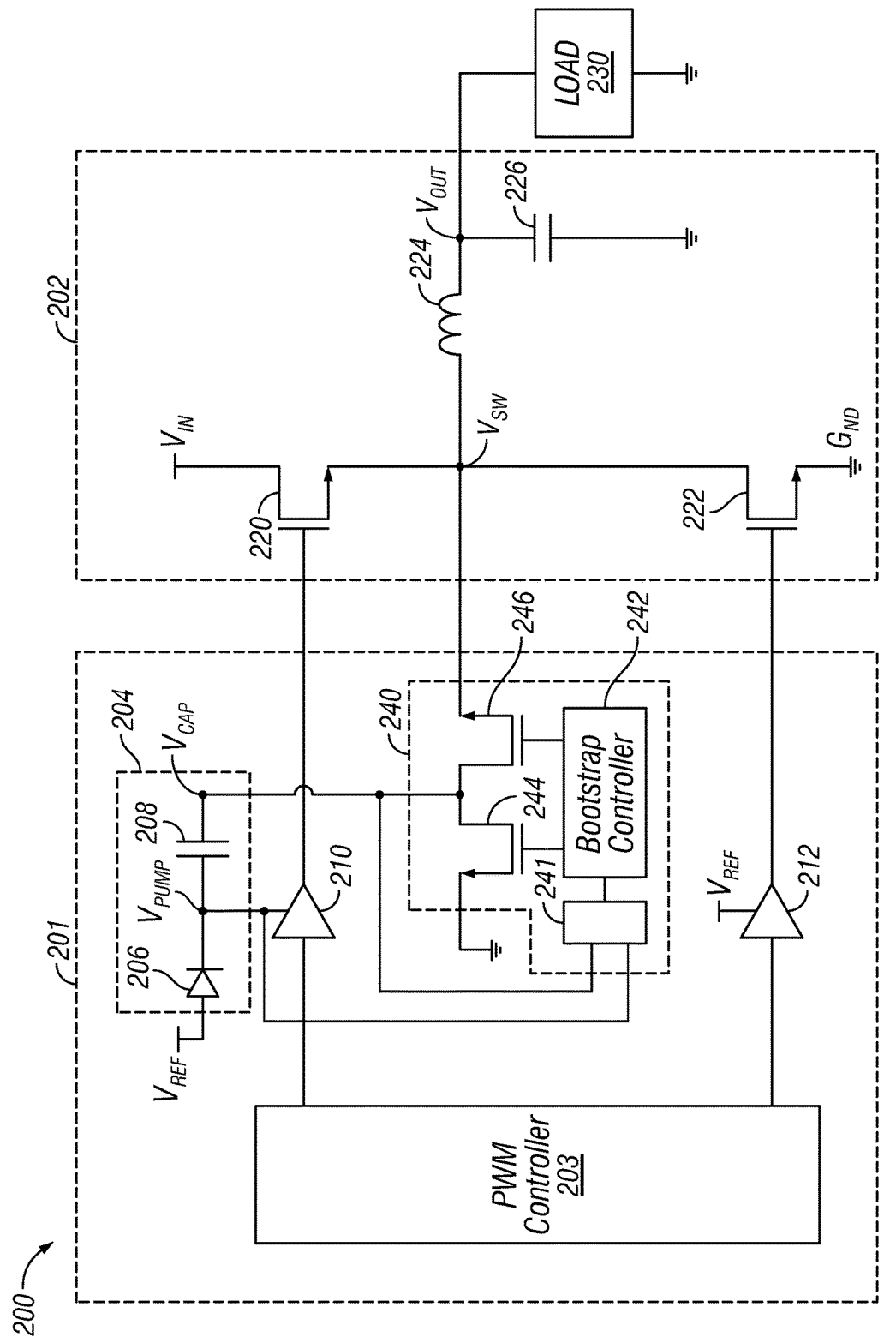
FIG. 2 illustrates a block diagram of a buck converter, in accordance with certain embodiments of the present disclosure.

FIG. 2 illustrates a block diagram of a buck converter, in accordance with certain embodiments of the present disclosure. Buck converter 200 depicted in FIG. 2 is one exemplary implementation of a switching power supply, also referred to as a switching converter. Buck converter 200 may include control circuit 201 and power stage 202. Power stage 202 may be configured in a buck topology with high-side transistor 220 coupled between a voltage input ($V_{IN}$) and a switching node ($V_{SW}$), low-side transistor 222 coupled between $V_{SW}$ and ground (GND), inductor 224 coupled between $V_{SW}$ and the voltage output ($V_{OUT}$), and output capacitor 226 coupled between $V_{OUT}$ and ground (GND). High-side transistor 220 may be any suitable type of transistor. For example, high-side transistor 220 may be an n-type metal oxide semiconductor field effect transistor (NMOS). Likewise, low-side transistor 222 may be any suitable type of transistor. For example, low-side transistor 222 may be an NMOS.

Power stage 202 may operate to provide a voltage and a current to load 230 coupled to $V_{OUT}$. Load 230 may be any electrical device that may consume power, such as processor 102, memory 104, mass storage device 106, input-output device 108, and/or graphics system 110 described above with reference to FIG. 1.

During normal switching operation, the high-side transistor 220 and low-side transistor 222 may alternate between opposing on and off states. For example, during a first phase of a switching cycle, high-side transistor 220 may turn on and low-side transistor 222 may turn off. During this first phase, the voltage at $V_{SW}$ may be pulled high to approximately the voltage of $V_{IN}$, and current may flow from high-side transistor, through inductor 224, to capacitor 226. Moreover, during this first phase, the current through inductor 224, and thus the inductive energy stored in inductor 224, may increase. During a second phase of a switching cycle, high-side transistor 220 may turn off, and low-side transistor 222 may turn on. During this second phase, the voltage at $V_{SW}$ may be pulled low to approximately the voltage of ground. Moreover, during this second phase, a decreasing current may flow from low-side transistor 222 through inductor 224 to capacitor 226, as the inductive energy stored in inductor 224 dissipates.

If the current through inductor 224 remains above zero amps at the end of the second phase, power stage 202 may transition from the second phase back to the first phase at the beginning of the next cycle. Such dual-phase operation may be referred to herein as continuous-conduction operation. However, if the current through inductor 224 falls to zero amps during the second phase, power stage may transition to a third phase before transitioning back to the first phase at the beginning of the next cycle. During this third phase, both high-side transistor 220 and low-side transistor 222 may be turned off, and the current through inductor 224 may remain stable at approximately zero amps. For the purposes of the present disclosure, such a third phase whereby both high-side transistor 220 and low-side transistor 222 are turned off may be referred to as the tri-state phase. Moreover, for the purposes of the present disclosure, such a three-phase operation may be referred to as discontinuous conduction operation.

The voltage of VOUT may generally be determined by the following equation: $V_{OUT}=D*V_{IN}$, where "D" is the duty cycle of buck converter 200. The duty cycle of buck converter 200 is defined by the percentage of time during a switching cycle of buck converter 200 that high-side transistor 220 is turned on. The duty cycle of buck converter 200 may be controlled by control circuit 201.

Control circuit 201 may include pulse-width-modulation (PWM) controller 203, high-side driver 210, and low-side driver 212. PWM controller 203 may be implemented with analog circuitry, digital circuitry, or a combination thereof. PWM controller 203 may drive high-side driver 210, which may act as a buffer and may drive high-side transistor 220 based on a signal received from PWM controller 203. PWM controller 203 may also drive low-side driver 212, which may act as a buffer and, in turn, drive low-side transistor 222. Accordingly, PWM controller 203 may control the duty cycle of buck converter 200. In some embodiments, PWM controller 203 may set the duty cycle of buck converter based on a voltage-mode feedback from the voltage output ($V_{OUT}$) of power stage 202. In some embodiments, PWM controller 203 may utilize a current-mode feedback, a hysteretic-mode feedback, or any other suitable type of feedback, in place of, or in combination with a voltage-mode feedback.

As described above with reference to power stage 202, high-side transistor 220 may be an NMOS transistor. The on-resistance of high-side transistor 220 contributes to efficiency loss of buck converter 200 when high-side transistor 220 is turned on (e.g., during a first phase of the switching cycle). Thus, minimizing the on-resistance of high-side transistor 220 may contribute to optimizing the efficiency of buck converter 200. High-side driver 210 may drive high-side transistor 220 on with a high gate voltage to minimize on-resistance, and thus optimize efficiency. For example, high-side driver 210 may drive the gate of high-side transistor 220 with a voltage that is at least a gate-to-source threshold level above the voltage at $V_{IN}$ in order to ensure that high-side transistor 220 operates in the saturation region when turned on. Moreover, high-side driver 210 may drive the gate of high-side transistor 220 with a voltage that is substantially more than a gate-to-source threshold level in order to further minimize the on-resistance of high-side transistor 220.

To drive the gate of high-side transistor 220 with a high-voltage level, buck converter 200 may utilize charge pump 204 and bootstrap circuit 240 to provide a high supply voltage to high-side driver 210. Accordingly, when high-side driver 210 drives the gate of high-side transistor 220 to turn on high-side transistor 220, high-side driver 210 may do so with a sufficiently high voltage to minimize the on-resistance of high-side transistor 220.

Charge pump 204 may include diode 206 and capacitor 208. Diode 206 may be coupled between a reference voltage ($V_{REF}$) and the $V_{PUMP}$ node which may supply high-side driver 210. Capacitor 208 may be coupled between the $V_{PUMP}$ node and the $V_{CAP}$ node, which may in turn be coupled to $V_{SW}$ via bootstrap circuit 240. $V_{REF}$ may be any suitable voltage that may be less than, equal to, or greater than $V_{IN}$. For the purposes of describing below the operation of buck converter 200, including charge pump 204, $V_{REF}$ and $V_{IN}$ may each be set to an example voltage of 5V.

During normal operation of buck converter 200 (e.g., during continuous conduction mode described above), the voltage at $V_{SW}$ may alternate between being driven to the voltage of ground (e.g., 0V) when low-side transistor 222 is on, and to the voltage of $V_{IN}$ (e.g., 5V) when high-side transistor 220 is on. Charge pump 204 may utilize the rising edge of this transition to create a voltage higher than $V_{REF}$. For example, pass transistor 246 may be turned on, and thus the voltage at $V_{CAP}$ may follow the voltage at $V_{SW}$. For example, when low-side transistor 222 is on, the voltage at $V_{SW}$, and at $V_{CAP}$, may be 0V. Meanwhile diode 206 may ensure that $V_{pump}$ remains at least at the voltage approximately equal to $V_{REF}$ (e.g., 5V), not accounting for the forward voltage drop across diode 206. The voltage across a capacitor such as capacitor 208 may not instantaneously change. Accordingly, when low-side transistor 222 turns off and high-side transistor 220 turns on, causing $V_{SW}$ and $V_{CAP}$ to increase from approximately 0V to 5V, the voltage at $V_{PUMP}$ may also increase by approximately 5V. For example, $V_{PUMP}$ may increase from 5V to 10V. High-side driver 210 may in turn utilize the charge pump voltage (e.g., 10V) to drive the gate of high-side transistor 220 with a high voltage that optimizes the on-resistance of high-side transistor 220.

During operation in a discontinuous conduction mode, for example, high-side transistor 220 may be turned on after a tri-state phase during which both high-side transistor 220 and low-side transistor 222 are turned off. During the tri-state phase, the voltage at $V_{SW}$ may not be pulled low by low-side transistor 222. Rather, $V_{SW}$ may be a floating voltage that may be pulled to a voltage above ground by, for example, leakage currents and/or any residual charge left on capacitor 226. Accordingly, when high-side transistor 220 turns on, $V_{SW}$ may not substantially increase in a manner that would allow charge pump 204 to utilize the transition of $V_{SW}$ to generate a voltage substantially higher than $V_{REF}$ as described above with reference to the operation of the $V_{SW}$ node and charge pump 204 during the continuous conduction mode.

But, bootstrap circuit 240 may cause charge pump 204 to operate in a similar manner as described above in operational modes where high-side transistor 220 is turned on after a phase during which both high-side transistor 220 and low-side transistor 222 were turned off. For example, bootstrap circuit 240 may ensure that charge pump 204 operates in a similar manner as described directly above when buck converter 200 operates in a discontinuous conduction mode whereby power stage 202 cycles through a first phase with high-side transistor 220 on and low-side transistor 222 off, a second phase with high-side transistor 220 off and low-side transistor 222 on, and a third phase (i.e., the tri-state phase) with both high-side transistor 220 and low-side transistor 222 off. As another example, bootstrap circuit 240 may ensure that charge pump 204 operates in a similar manner as described directly above when buck converter 200 turns high-side transistor 220 on after coming out of a standby mode during which both high-side transistor 220 and low-side transistor 222 were turned off for an extended period of time.

Bootstrap circuit 240 may include bootstrap controller 242, pass transistor 246, and pull-down transistor 244. Bootstrap controller 242 may be a controller implemented with digital circuitry, analog circuitry, or a combination thereof. In various embodiments, bootstrap controller 242 may be implemented in the same circuit block as PWM controller 203, or in a separate circuit block from PWM controller 203. Bootstrap controller 242 may be coupled to drive both pass transistor 246 and pull-down transistor 244. Pull-down transistor 244 may be coupled between the $V_{CAP}$ node and ground, and pass transistor 246 may be coupled between the $V_{CAP}$ node and the $V_{SW}$ node of buck converter 200.

During operation of buck converter 200 in a discontinuous conduction mode, for example, bootstrap controller 242 may turn on pass transistor 246 and thereby couple the $V_{CAP}$ node to the $V_{SW}$ node during a first phase when high-side transistor 220 is on and low-side transistor 222 is off, and also during a second phase when high-side transistor 220 is off and low-side transistor 222 is on. Subsequently, during a third phase when both high-side transistor 220 and low-side transistor 222 are off, bootstrap controller 242 may turn off pass-transistor 246, thereby decoupling the $V_{CAP}$ node of charge pump 204 from the $V_{SW}$ node of buck converter 200. During this third phase (e.g., the tri-state phase), bootstrap controller 242 may turn on pull-down transistor 244, and thereby force the voltage at the $V_{CAP}$ node to approximately 0V.

When a new switching cycle begins, buck converter 200 may return to a first phase with high-side transistor 220 on and low-side transistor 222 off. During this first phase, bootstrap controller 242 may turn pull-down transistor 244 off and pass transistor 246 on, thereby re-coupling the $V_{CAP}$ node of charge pump 204 to the switching node $V_{SW}$ of power stage 202. Accordingly, during the transition of buck converter 200 from the tri-state phase to the first phase, the voltage at $V_{CAP}$ may transition from approximately 0V to approximately the voltage of $V_{IN}$ (e.g., 5V). As described above, the voltage across a capacitor such as capacitor 208 may not instantaneously change. Accordingly, when $V_{CAP}$ increases from approximately 0V to approximately 5V, the voltage at $V_{PUMP}$ may also increase by approximately 5V. For example, $V_{PUMP}$ may increase from 5V to 10V. High-side driver 210 may in turn utilize the charge pump voltage (e.g., approximately 10V) to drive the gate of high-side transistor 220 with a high voltage that optimizes the on-resistance of high-side transistor 220.

Although the operation of bootstrap circuit 240 is described above with reference to a discontinuous conduction mode of buck converter 200 in FIG. 2, bootstrap circuit 240 and charge pump 204 may operate in a similar manner as described above for any operational mode where buck converter 200 turns high-side transistor 220 on after coming out of a tri-state phase during which both high-side transistor 220 and low-side transistor 222 were turned off for a period of time. FIGS. 3A and 3B described below illustrate the operation of various components of buck converter 200 during any such mode of operation.

FIG. 3A illustrates a table depicting the operation of components of a buck converter, in accordance with certain embodiments of the present disclosure. In some embodiments, bootstrap controller 242 may drive the pass transistor 246 and pull-down transistor 244 based on the state of high-side transistor 220 and low-side transistor 222. For example, as shown in table 302 of FIG. 3A, high-side transistor 220 and low-side transistor 222 may alternate between opposing on and off states during the first and second phase, and may both turn off during the third phase (e.g., the tri-state phase). During the first and second phase, bootstrap controller 242 may turn pass transistor 246 on and pull-down transistor 244 off during the first and second phase, and may turn pass transistor 246 off and pull-down transistor 244 on during the third phase (e.g., the tri-state phase).

FIG. 3B illustrates a table depicting the operation of components of a buck converter, in accordance with certain embodiments of the present disclosure. In some embodiments, bootstrap circuit 240 may include sensor 241, which may monitor the voltage across capacitor 208. For example, sensor 241 may include one or more voltage comparators which may compare the voltage across capacitor 208 to one or more voltage thresholds. In such embodiments, bootstrap circuit 240 may control pull-down transistor 244 and pass transistor 246 based at least in part on the measured voltage across capacitor 208. For example, as shown in table 304 of FIG. 3B, bootstrap controller 242 may alter the control of pull-down transistor 244 and pass-transistor 246 depending on the voltage sensed across capacitor 208.

For example, when the voltage across capacitor 208 ($V_{208}$) is less than a low threshold (e.g., 3V), bootstrap controller 242 may drive pull-down transistor 244 on and pass transistor 246 off during any phase at which that high-side transistor 220 is off. When the voltage across capacitor 208 is between a low threshold and a high threshold, bootstrap controller 242 may drive pull-down transistor 244 and pass transistor 246 in a similar manner as illustrated in FIG. 3A. Further, when the voltage across capacitor 208 ($V_{208}$) is greater than a high threshold (e.g., 4.5V), bootstrap controller 242 may drive pull-down transistor 244 off and pass transistor 246 on during all phases of a switching cycle.

Although bootstrap circuit 240 has been described above with reference to FIGS. 2, 3A, and 3B, as being implemented in a buck converter 200, bootstrap circuit 240 may be implemented in any suitable type of switch-mode converter that may utilize a charge pump to provide a high voltage supply for driving the gate of a high-side transistor of the switch-mode converter. For example, bootstrap circuit 240 may be implemented in any other buck series topology converters or any other suitable type of switching converter that utilizes a high-side transistor, such as a buck-boost converter, a full bridge converter, a half bridge converter, an inductor-inductor-capacitor (LLC) converter.

Figure 4:
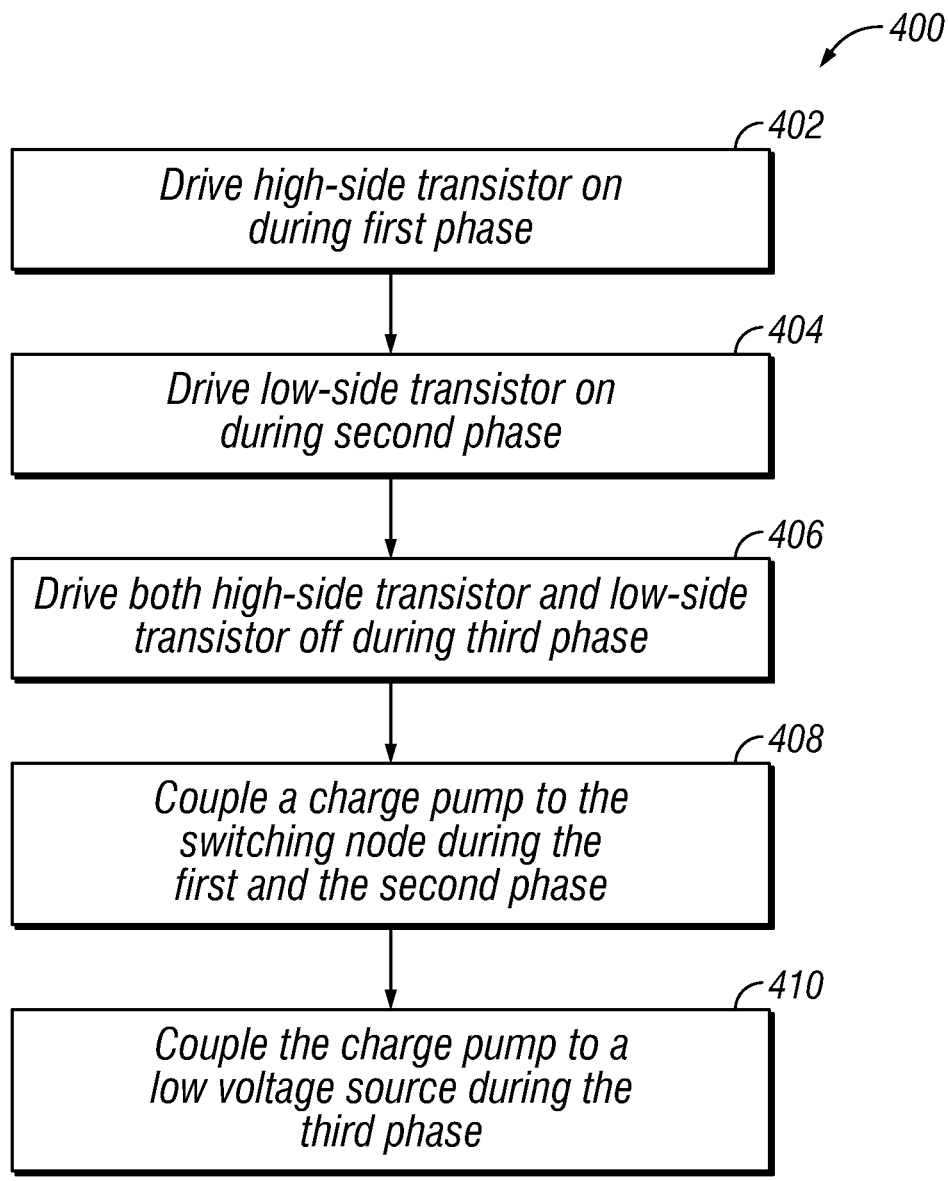
FIG. 4 illustrates a flow chart for an example method for controlling a switching converter, in accordance with certain embodiments of the present disclosure.

FIG. 4 illustrates a flow chart for an example method for controlling a switching converter, in accordance with certain embodiments of the present disclosure. Although the steps of method 400 are described below with reference to buck regulator 200, the steps of method 400 may be performed by any other buck series topology converters or any other suitable type of switching converter that utilizes a high-side transistor, such as a buck-boost converter, a full bridge converter, a half bridge converter, an LLC converter. Further, although FIG. 4 discloses a particular number of steps to be taken with respect to method 400, method 400 may be executed with greater or lesser steps than those depicted in FIG. 4. In addition, although FIG. 4 discloses a certain order of steps to be taken with respect to method 400, the steps comprising method 400 may be completed in any suitable order.

Method 400 may begin at step 402. At step 402, a high-side transistor may be driven on. For example, high-side transistor 220 may be driven on by high-side driver 210 during a first phase of a switching cycle of buck converter 200.

At step 404, a low-side transistor may be driven on. For example, high-side transistor 220 may be driven off by high-side driver 210, and low-side transistor 222 may be driven on by low-side driver 212 during a second phase of a switching cycle of buck converter 200.

At step 406, both the high-side transistor and the low-side transistor may be driven off. For example, both high-side transistor 220 and low-side transistor 222 may be driven off by their corresponding drivers during a third phase (e.g., a tri-state phase) of a switching cycle of the buck converter.

At step 408, a charge pump may be coupled to the switching node of the switching converter during the first and second phases described above in steps 402 and 404. For example, bootstrap controller 242 may drive pass-transistor 246 on during the first and second phases of the switching cycle, thereby coupling a terminal of capacitor 208 in charge pump 204 to the switching node ($V_{SW}$) of buck regulator 200.

At step 410, the charge pump may be coupled to the switching node of the switching converter during the third phase described above in step 406. For example, bootstrap controller 242 may decouple capacitor 208 in charge pump 204 from $V_{SW}$ by driving pass transistor 246 off, and couple capacitor 208 to a low voltage source (e.g., ground) by driving pull-down transistor 244 on.

The steps of method 400 may be completed during, for example, one switching cycle of buck converter 200. After one switching cycle of buck converter 200, the steps of method 400 may be repeated during subsequent switching cycles.

Figure 5:
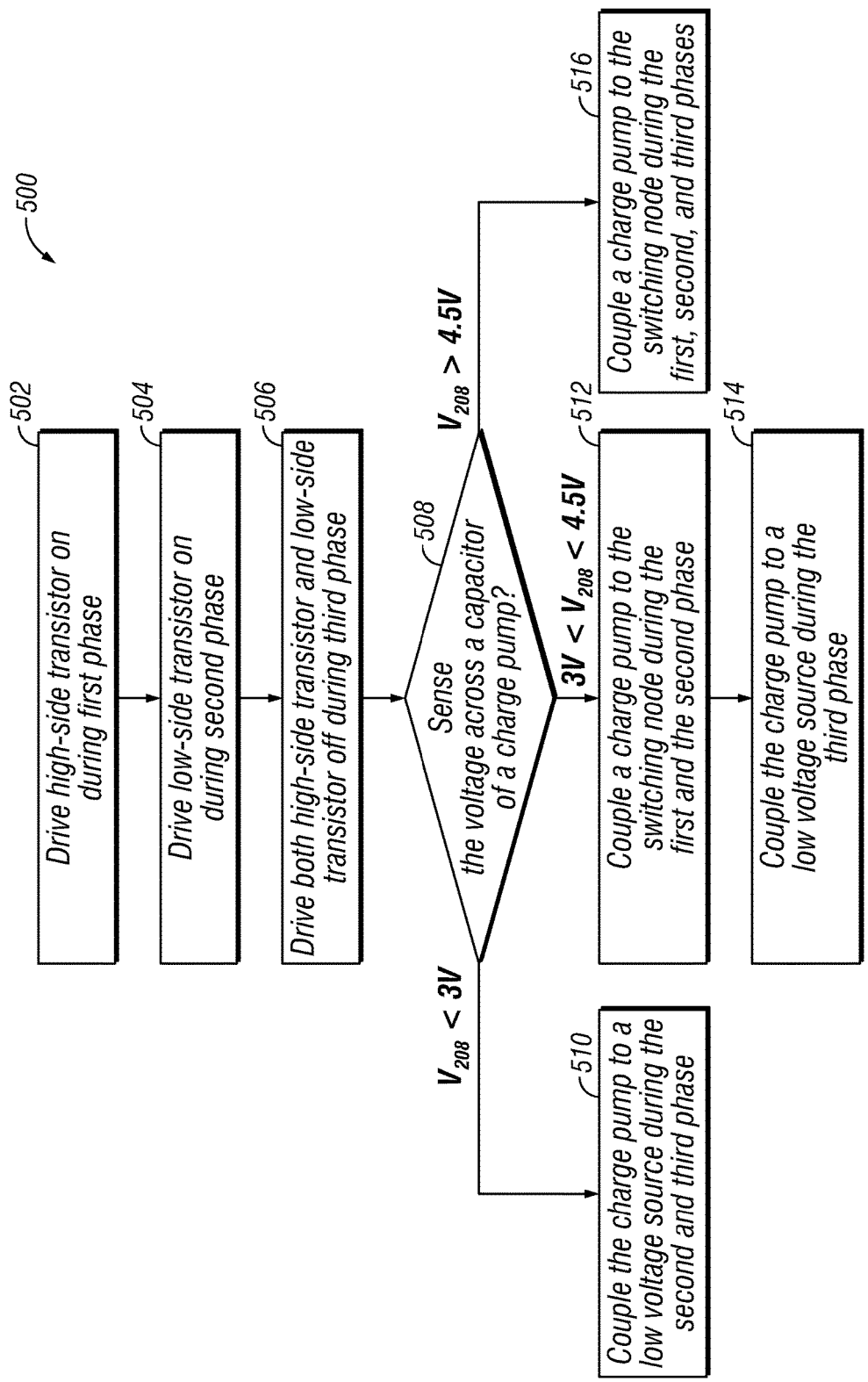
FIG. 5 illustrates a flow chart for an example method for controlling a switching converter, in accordance with certain embodiments of the present disclosure.

FIG. 5 illustrates a flow chart for an example method for controlling a switching converter, in accordance with certain embodiments of the present disclosure. Although the steps of method 500 are described below with reference to buck regulator 200, the steps of method 500 may be performed by any other buck series topology converters or any other suitable type of switching converter that utilizes a high-side transistor, such as a buck-boost converter, a full bridge converter, a half bridge converter, an LLC converter. Further, although FIG. 5 discloses a particular number of steps to be taken with respect to method 500, method 500 may be executed with greater or lesser steps than those depicted in FIG. 5. In addition, although FIG. 5 discloses a certain order of steps to be taken with respect to method 500, the steps comprising method 500 may be completed in any suitable order.

Method 500 may begin at step 502. At step 502, a high-side transistor may be driven on. For example, high-side transistor 220 may be driven on by high-side driver 210 during a first phase of a switching cycle of buck converter 200.

At step 504, a low-side transistor may be driven on. For example, high-side transistor 220 may be driven off by high-side driver 210, and low-side transistor 222 may be driven on by low-side driver 212 during a second phase of a switching cycle of buck converter 200.

At step 506, both the high-side transistor and the low-side transistor may be driven off. For example, both high-side transistor 220 and low-side transistor 222 may be driven off by their corresponding drivers during a third phase (e.g., a tri-state phase) of a switching cycle of the buck converter.

At step 508, a voltage across a capacitor of a charge pump in the switching converter may be sensed. For example, sensor 241 may sense the voltage across capacitor 208 in charge pump 204 and may compare the sensed voltage to one or more thresholds. Method 500 may proceed from step 508 to one of steps 510, 512, or 516 based on the comparison.

If the voltage across the capacitor (e.g., $V_{208}$ across capacitor 208) is lower than a first threshold (e.g., 3V), method 500 may proceed to step 510. At step 510, the charge pump may be coupled to a low voltage source during the second and third phase. For example, bootstrap controller 242 may drive pass transistor 246 off, and may drive pull-down transistor 244 on, during the second and third phases of the switching cycle (i.e., the phases during which high-side transistor 220 is off), in order to couple a terminal of capacitor 208 to a low voltage source (e.g., ground) during those phases.

If the voltage across the capacitor (e.g., $V_{208}$ across capacitor 208) is between the first threshold (e.g., 3V) and a second threshold (e.g., 4.5V), method 500 may proceed to steps 512 and 514. At step 512, a charge pump may be coupled to the switching node of the switching converter during the first and second phases described above in steps 502 and 504. For example, bootstrap controller 242 may drive pass-transistor 246 on during the first and second phases of the switching cycle, thereby coupling a terminal of capacitor 208 in charge pump 204 to the switching node ($V_{SW}$) of buck regulator 200. At step 514, the charge pump may be coupled to the switching node of the switching converter during the third phase described above in step 506. For example, bootstrap controller 242 may decouple capacitor 208 in charge pump 204 from $V_{SW}$ by driving pass transistor 246 off, and couple capacitor 208 to a low voltage source (e.g., ground) by driving pull-down transistor 244 on.

If the voltage across the capacitor (e.g., $V_{208}$ across capacitor 208) is greater than the second threshold (e.g., 4.5V), method 500 may proceed to step 516. At step 516, a charge pump may be coupled to the switching node of the switching converter during each of the first, second, and third phases. For example, bootstrap controller 242 may drive pull-down transistor 244 off, and may drive pass transistor 246 on in order to couple a terminal of capacitor 208 in charge pump 204 to the switching node $V_{SW}$ of buck converter 200 during each of the first, second, and third phases described above in steps 502, 504, and 506.

Although the present disclosure and its advantages have been described in detail, it should be understood that various changes, substitutions and alterations can be made herein without departing from the spirit and scope of the disclosure as defined by the following claims.

What is claimed is:

1. A switching converter, comprising:
   a high-side transistor coupled between a voltage input and a switching node;
   a low-side transistor coupled between the switching node and ground;
   a high-side driver coupled to drive a gate of the high-side transistor;
   a charge pump coupled to the high-side driver; and
   a bootstrap circuit including:
      a pass transistor coupled between the charge pump and the switching node; and
      a pull-down transistor coupled between the charge pump and ground;
   wherein the bootstrap circuit is configured to:
      drive the pass transistor on and the pull-down transistor off when one of the high-side transistor and the low-side transistor is on; and
      drive the pass transistor off and the pull-down transistor on when both of the high-side transistor and the low-side transistor are off.

2. The switching converter of claim 1, wherein the switching converter is a buck converter.

3. The switching converter of claim 1, wherein the switching converter is one of a buck converter, a full-bridge converter, a buck-boost converter, a half-bridge converter, and an LLC converter.

4. The switching converter of claim 1, wherein the high-side transistor is an n-type metal oxide semiconductor field effect transistor.

5. The switching converter of claim 1, further comprising a pulse-width modulation controller configured to determine a duty cycle of the switching converter and to drive the high-side transistor via the high-side driver and to drive the low-side transistor via a low-side driver.

6. The switching converter of claim 1, wherein the bootstrap circuit further comprises a bootstrap controller configured to drive the pass transistor and the pull-down transistor of the bootstrap circuit based on a state of the high-side transistor and the low-side transistor.

7. The switching converter of claim 1, wherein the bootstrap circuit comprises a sensor coupled to sense a voltage across a capacitor of the charge pump.

8. The switching converter of claim 7, wherein the bootstrap circuit further comprises a bootstrap controller configured to drive the pass transistor and the pull-down transistor of the bootstrap circuit based on the voltage across the capacitor of the charge pump and based on a state of the high-side transistor and the low-side transistor.

9. The switching converter of claim 1, wherein the bootstrap circuit is configured to:
   drive the pass transistor off and the pull-down transistor on when a voltage across a capacitor of the charge pump is less than a first threshold and the high-side transistor is off;
   drive the pass transistor on and the pull-down transistor off when the voltage across the capacitor of the charge pump is between the first threshold and a second threshold and one of the high-side transistor and the low-side transistor is on;
   drive the pass transistor off and the pull-down transistor on when the voltage across the capacitor of the charge pump is between the first threshold and the second threshold and both of the high-side transistor and the low-side transistor are off; and
   drive the pass transistor on and the pull-down transistor off when the voltage across the capacitor of the charge pump is greater than the second threshold.

10. A method, comprising:
    driving a high-side transistor of a switching converter, coupled between a voltage input and a switching node of the switching converter, on during a first phase;
    driving a low-side transistor of the switching converter, coupled between the switching node of the switching converter and ground, on during a second phase;
    driving the low-side transistor and the high-side transistor off during a third phase;
    coupling a charge pump node to the switching node of the switching converter during the first phase and the second phase by driving a pass transistor coupled between the charge pump and the switching node on and a pull-down transistor coupled between the charge pump and a ground off; and
    coupling the charge pump node to the ground during the third phase by driving the pass transistor off and the pull-down transistor on.

11. The method of claim 10, further comprising generating a high-voltage supply with a charge pump coupled to the charge pump node and providing the high-voltage supply to a high-side driver coupled to the high-side transistor.

12. The method of claim 10, wherein the switching converter is one of a buck converter, a buck-boost converter, a full-bridge converter, a half-bridge converter, and an LLC converter.

13. The method of claim 10, wherein the high-side transistor in an n-type metal oxide semiconductor field effect transistor.

14. A method, comprising:
    driving a high-side transistor of a switching converter, coupled between a voltage input and a switching node of the switching converter, on during a first phase;
    driving a low-side transistor of the switching converter, coupled between the switching node of the switching converter and ground, on during a second phase;
    driving the low-side transistor and the high-side transistor off during a third phase;
    sensing a voltage across a capacitor of a charge pump of the switching converter;
    when the voltage across the capacitor is lower than a first threshold, coupling a charge pump node to a ground during the second and third phases;
    when the voltage across the capacitor is between the first threshold and a second threshold, coupling the charge pump node to the switching node during the first and second phases, and coupling the charge pump node to the ground during the third phase; and when the voltage across the capacitor is greater than the second threshold, coupling the charge pump node to the switching node during the first, second, and third phases.

15. The method of claim 14, wherein coupling the charge pump node to the switching node comprises turning on a pass transistor coupled between the charge pump and the switching node.

16. The method of claim 14, further comprising generating a high-voltage supply with a charge pump coupled to the charge pump node and providing the high-voltage supply to a high-side driver coupled to the high-side transistor.

17. The method of claim 14, wherein the switching converter is one of a buck converter, a buck-boost converter, a full-bridge converter, a half-bridge converter, and an LLC converter.

18. The method of claim 14, wherein the high-side transistor in an n-type metal oxide semiconductor field effect transistor.

* * * * *